(12) United States Patent
Davidson et al.

(10) Patent No.: US 10,857,610 B2
(45) Date of Patent: Dec. 8, 2020

(54) METHOD AND APPARATUS FOR PULSE WELDING

(71) Applicant: Illinois Tool Works Inc., Glenview, IL (US)

(72) Inventors: Robert R. Davidson, New London, WI (US); Richard J. Schuh, Freedom, WI (US); Justin M. Durik, Black Creek, WI (US); Thomas A. Bunker, De Pere, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1014 days.

(21) Appl. No.: 15/237,308

(22) Filed: Aug. 15, 2016

(65) Prior Publication Data

US 2017/0050255 A1    Feb. 23, 2017

Related U.S. Application Data (60) Provisional application No. 62/206,795, filed on Aug. 18, 2015.

(51) Int. Cl.
*B23K 9/09* (2006.01)
*B23K 9/10* (2006.01)
*B23K 9/095* (2006.01)

(52) U.S. Cl.
CPC ............. *B23K 9/092* (2013.01); *B23K 9/091* (2013.01); *B23K 9/093* (2013.01); *B23K 9/0953* (2013.01); *B23K 9/1006* (2013.01)

(58) Field of Classification Search
CPC ...... B23K 9/092; B23K 9/093; B23K 9/0953; B23K 9/1006; B23K 9/091; B23K 11/241; B32K 11/24
USPC ............ 219/130.51, 130.5, 115, 108, 130.33
See application file for complete search history.

(56) References Cited

U.S. PATENT DOCUMENTS

| | | | |
|---|---|---|---|
| 5,001,326 A | 3/1991 | Stava | |
| 5,742,029 A | 4/1998 | Stava et al. | |
| 6,329,636 B1 * | 12/2001 | Geissler | B23K 9/1006 219/130.1 |
| 6,909,067 B2 | 6/2005 | Davidson et al. | |
| 8,704,131 B2 * | 4/2014 | Davidson | B23K 9/092 219/130.51 |

FOREIGN PATENT DOCUMENTS

WO    2008/137371 A2    11/2008

OTHER PUBLICATIONS

International Preliminary Report on Patentability, dated Feb. 20, 2018, International Bureau of WIPO, 1211 Geneva 20, Switzerland.

* cited by examiner

*Primary Examiner* — Ibrahime A Abraham
*Assistant Examiner* — Elizabeth M Sims
(74) *Attorney, Agent, or Firm* — George R. Corrigan (57) ABSTRACT

A method and apparatus for providing welding type power is disclosed. The output is cyclical, and is a controlled voltage output during the background and/or peak and a controlled current output during the transition up and/or down. During the controlled current portion the output is responsive to output voltage.

14 Claims, 7 Drawing Sheets

FIG. 5  NEW VOLTAGE COMPENSATED CURRENT COMMAND

METHOD AND APPARATUS FOR PULSE WELDING

FIELD OF THE INVENTION

The present invention relates generally to the art of welding and welding power supplies. More specifically, it relates to pulse welding and pulse welding power supplies and the transitions between peak and background.

BACKGROUND OF THE INVENTION

There are many known types of welding systems used for many different welding processes. Welding type system, or system for providing welding type power, as used herein, includes one or more of a power source, controller, wire feeder, and a source of gas, it may also include peripherals such as robots etc., that cooperate to provide welding type power. Welding power supply, as used herein, includes any device capable of supplying welding, plasma cutting, and/or induction heating power including power circuitry, control circuitry and other ancillary circuitry associated therewith. Welding-type power, as used herein, is power suitable for welding, induction heating or plasma cutting.

One type of welding system includes a current controlled (or controlled current) welding power source. A current controlled power source, as used herein, is a power source wherein the output current is monitored, and the output is adjusted to provide the desired current. The current may be constant during the welding process, or may have a desired waveform of varying current. Current controlled (or controlled current) welding power, as used herein, is an output wherein the current is monitored and adjusted to provide the desired current.

Another type of welding system includes a voltage controlled (or controlled voltage) power source. A voltage controlled power source, as used herein, is a power source wherein the output voltage is monitored, and the output is adjusted to provide the desired voltage. The voltage may be constant during the welding process, or may have a desired waveform of varying voltage. Voltage controlled (or controlled voltage) welding power, as used herein, is an output wherein the voltage is monitored and adjusted to provide the desired current. Some voltage controlled welding power sources use a current command, and adjust the current in response to the monitored voltage, thereby adjusting the arc voltage by the change in current across the load.

Figure 1:
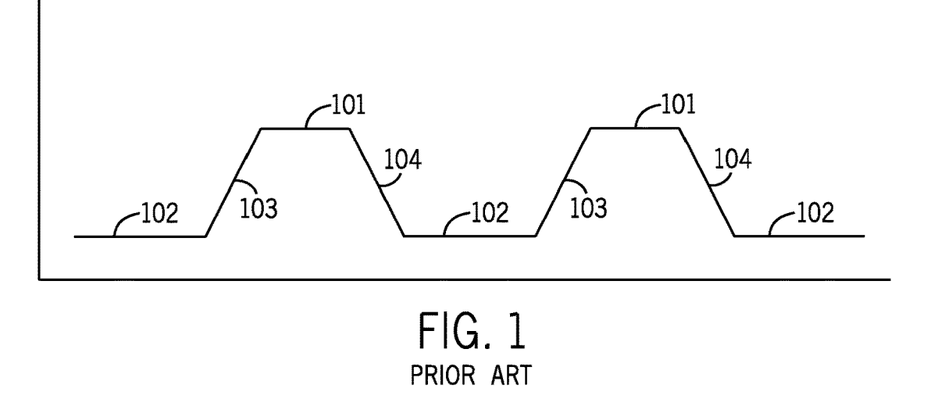
FIG. 1 is prior art pulse welding cycle.

One known welding process is a pulsed MIG process. A pulsed MIG process typically has a cyclical output having at least a peak portion with a relatively high current and a background portion with a relatively low current. A typical prior art pulsed MIG welding cycle is shown in FIG. 1, and includes a flat peak 101, a background 102, and steep transitions 103 and 104 between them. There is often an abrupt change in slope from the beginning and end of the peak and background portions. Pulse welding, as used herein, includes welding with output power that is generally pulsed, at a controllable frequency, between a greater peak and a lesser background, and pulse welding is performed in an arc state. Occasional, inadvertent shorts may occur, but the process is generally in an arc state. Welding cycle (or pulse cycle), as used herein, is comprised of at least a peak, followed by a transition down, followed by a background, followed by a transition up. Welding cycles are typically on the order of milliseconds or tens of milliseconds. Welding cycles can include other portions as well, and a controller can use a state based control scheme where, under certain circumstance, the typical order (peak, down, background, up) is not followed.

Another welding process is short circuit or spray MIG welding. Short circuit MIG welding typically transfers in a short condition (short circuit welding). Spray MIG welding continuously sprays balls (spray mode) across the arc (typically without intentionally shorting to the weld puddle). The molten ball is transferred at any time during the process (when a short occurs or when there is sufficient ball size and arc force for spray mode). Short circuit MIG welding typically has a single voltage target, not a defined waveform, with a control loop to maintain and average voltage (not a defined waveform). This is different from pulse welding which typically begins (and sometimes finishes the molten ball transfer) while in an arc condition. The molten ball is typically transferred during or shortly after the peak (the time of transfer is controlled by the waveform). Also, pulse welding has multiple output targets, including CV ramping, peak and background portions, and follows a defined voltage/current waveform. The embodiments below will be described with respect to pulse welding.

Undesirable audible arc noise is generated by the sharp edges in the pulse waveform of FIG. 1. Also, the sharp slope changes can cause difficulty when welding with specialty wires such as Inconel®, Monel®, and Hastelloy®, as well as aluminum, metalcore and stainless wires. For example, using such wires with prior art pulsed MIG can result in sharp edges or craters at the edges of the weld where it meets the plate. Moreover, fast slope changes from peak to background can result in arc outages at lower currents. Fast slope changes from peak to background and back to peak can cause over and under shoots of the current.

Prior art U.S. Pat. Nos. 5,742,029 and 5,001,326 discussed controlling the amount of energy in a surface tension transfer process pulse by providing an exponential decay during the tail out. However, that process also taught very rapid transitions from peak to background in other portions of the pulse. Thus, it failed to satisfactorily address arc noise.

Other prior art systems such as the Miller Pulse Star® and Summit Arc® were phase controlled systems with sinusoidal outputs that might provide less abrupt transitions, but operate at either fixed frequencies or harmonic frequencies.

Figure 2:
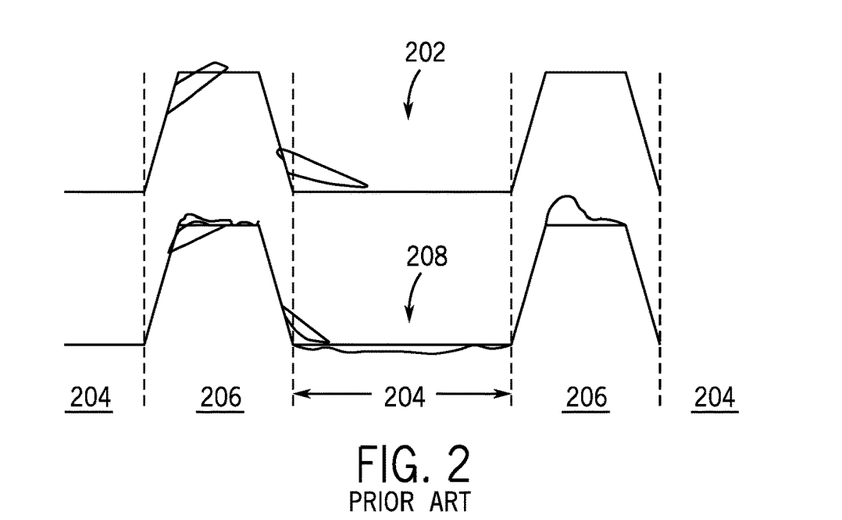
FIG. 2 is prior art pulse welding cycle with soft corners.

One prior art patent, U.S. Pat. No. 6,909,067, hereby incorporated by reference, used a combination of a fast current controlled ramp followed by a slower voltage controlled ramp to soften corners. This was better than the prior art, but was operative only at the beginning and end of the peak and background portions, and not during the entire transition. FIG. 2 shows a welding cycle in accordance with this prior art.

Figure 3:
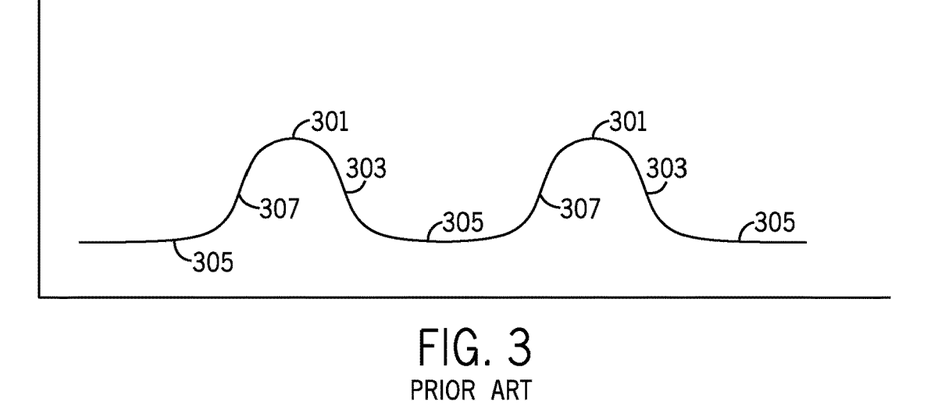
FIG. 3 is prior art pulse welding cycle with soft transitions.

U.S. Pat. No. 8,704,131, hereby incorporated by reference, taught pulsed MIG welding with a non-zero acceleration during transitions between peak and background by gradually adjusting the slope. FIG. 3 shows a welding cycle in accordance with this prior art.

The prior art, particularly U.S. Pat. Nos. 6,909,067 and 8,704,131 teaches a way to provide an output well suited for pulse welding with a controlled voltage peak and controlled voltage background. During the peak and background the current is continuously adjusted to maintain a fixed arc length. This accounts for changes in stickout (weld tip to the end of the wire), puddle fluctuations, welding over tack welds, etc. However, the controlled current transitions between peak and background (or background and peak) do not adjust for any arc changes. Tradeoffs were made to balance the short of the wire to the weld puddle, the flaring arc (to slow to reduce peak energy) and the response of the process (lengthy transitions shorten the time in CV, when adjustment for arc variations are made).

When linear ramps are used during the controlled current transitions, there is sufficient time to adjust for voltage variations. This results in a very responsive welding arc, which is preferable. When soft curves are used during the controlled current transition portion, there is more time spent in a controlled current mode instead of the controlled voltage mode. This results in a slow response to wire stick-out changes, the weld puddle movements, operator manipulation, etc.

Accordingly, a way to pulse weld with adjustments for arc changes while in the transition portions is desirable.

SUMMARY OF THE PRESENT INVENTION

According to a first aspect of the disclosure a welding-type system provides a plurality of welding cycles, with each cycle being a peak portion, a transition down portion, a background portion, and a transition up portion. The system includes an input circuit, a power circuit, a controller and an output circuit. The input circuit receives input power and provides intermediate power. The power circuit has a power control input and at least one switch that is responsive to the power control input. The power circuit receives the intermediate power and provides welding-type output power to the output circuit. A feedback circuit provides a feedback signal responsive to the output voltage and responsive to the output current to the controller. The controller has a peak module, a transition down module, a background module, and a transition up module. The controller sequentially activates the peak module, then the transition down module, then the background module, then the transition up module, and then back to the peak module, thereby commanding a welding cycle. At least one of the peak module and the background module are controlled voltage modules, and at least one of the transition up module and transition down module is a controlled current module that has a transition current command output that is responsive to the fedback output voltage.

According to a second aspect of the disclosure a method of providing welding type power as a plurality of welding cycles, with each cycle having a peak portion, a transition down portion, a background portion, and a transition up portion includes receiving input power, providing intermediate power, receiving the intermediate power and switching it to provide welding-type output power. A feedback signal responsive to the output voltage and responsive to the output current is provided and the switching is done in response to the feedback signal to provide the peak portion, the transition down portion, the background portion, and the module, and transition up portion. The switching is controlled to provide a controlled voltage during at least one of the peak portion and the background portion, and to provide a controlled current and in response to output voltage during at least one of the transition up portion and the transition down portion.

According to a third aspect of the disclosure a method of providing welding type power as a plurality of welding cycles, with each cycle having a peak portion, a transition down portion, a background portion, and a transition up portion includes receiving input power, providing intermediate power, receiving the intermediate power and switching it to provide welding-type output power. A feedback signal responsive to the output voltage and responsive to the output current is provided and the switching is done in response to the feedback signal to provide the peak portion, the transition down portion, the background portion, and transition up portion. The switching is controlled to provide a controlled voltage during at least one of the peak portion and the background portion, and, during at least one of the transition up portion and the transition down portion, the switching is controlled by a voltage ramping algorithm that tracks to a target voltage waveform shape.

Both of the transition modules are controlled current modules that have a transition current command output that is responsive to output voltage in one alternative.

The transition current command output is responsive to a difference between a desired transition voltage and a previous transition voltage during at least one prior welding output cycle in another alternative.

The transition current command output is responsive to a difference between a measured output voltage and a background voltage from one or more prior cycles divided by the difference between the background voltage from those cycles and a peak voltage from those cycles in various embodiments.

The transition current command output is responsive to a conductance multiplied by a desired output voltage in another alternative.

The conductance varies over the transition based on a formula, and/or a plurality of prior cycles, and/or a plurality of predetermined values in various embodiments.

The desired output voltage is responsive to a plurality of taught values and a difference between a prior desired output voltage and a prior actual voltage for at least one prior cycle, and/or whether or not the output is in an arc state or a short state other alternatives.

According to a fourth aspect of the disclosure a method of providing welding type power as a plurality of welding cycles, with each cycle having a peak portion, a transition down portion, a background portion, and a transition up portion includes receiving input power, providing intermediate power, receiving the intermediate power and switching it to provide welding-type output power. A feedback signal responsive to the output voltage and responsive to the output current is provided and the switching is done in response to the feedback signal to provide the peak portion, the transition down portion, the background portion, and the module, and transition up portion. The switching is controlled to provide a controlled voltage during at least one of the transition up portion and the transition down portion.

The switching is controlled to provide a controlled voltage during one or both of the peak portion and the background portion, and/or to provide a controlled voltage during both of the transition up portion and the transition down portion in various alternatives.

Other principal features and advantages of will become apparent to those skilled in the art upon review of the following drawings, the detailed description and the appended claims.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system for providing welding power, with particular components, and used for particular processes, it should be understood at the outset that the invention may also be implemented with other welding systems, processes, components, controllers, etc.

Generally, the disclosure provides for controlled pulsed MIG welding with transitions (one or both) between the peak and background by providing a controlled current transition that is also responsive to output voltage. Pulse welding, as used herein, includes welding in an arc state with output power that is generally pulsed, at a controllable frequency, between a greater peak and a lesser background. Pulse welding power, as used herein, refers to welding output power that is generally in an arc state and pulsed at a controllable frequency between a greater peak and a lesser background. Alternatives provide for controlled voltage transitions.

The system includes a controller with a background module that controls the background portion of the output waveform, a transition up module that controls the transition up portion of the output waveform, a peak module that controls the peak portion of the output waveform, and a transition down module that controls the transition down portion of the output waveform.

Controller, as used herein, includes digital and analog circuitry, discrete or integrated circuitry, DSPs, microprocessors, etc., and maybe located on one or more boards. Background portion, as used herein, includes the portion of a pulse cycle where the output is less than the minimum plus 25% of the difference between the maximum and the minimum. Background module, as used herein, is a module that controls a power circuit to provide a background portion of a weld cycle. Peak module, as used herein, is a module that controls a power circuit to provide a peak portion of welding cycle. Peak portion, as used herein, includes the portion of a pulse or welding cycle where the output is more than the maximum less 25% of the difference between the maximum and the minimum. Transition module, as used herein, is a module that controls a power circuit to provide a transition portion of welding cycle. Transition voltage, as used herein, is the voltage during a transition. Transition down, as used herein, includes the portion of a pulse or weld cycle where the output decreases from the peak to the background. Transition down module, as used herein, is a module that controls a power circuit to provide a transition down portion of a weld cycle. Transition up, as used herein, includes the portion of a pulse or weld cycle where the output increases from the background to the peak. Transition up module, as used herein, is a module that controls a power circuit to provide a transition up portion of a weld cycle. Module, as used herein, includes software and/or hardware, digital or analog, that cooperate to perform one or more control tasks, and can include digital commands, power circuitry, networking hardware, etc.

The controller sequentially activates the modules to create the weld cycle. Activate a module, as used herein, refers to using a module in the control scheme. One or both of the transition up module and the transition down module are controlled current modules that use voltage feedback. Controlled current module, as used herein is a module that provides a command for a power circuit that causes the power circuit to provide a current controlled output. Current command output, as used herein, is an output of a controller used to command a power circuit to provide a desired current output. One or both of the background module and peak module are controlled voltage modules. Controlled voltage module, as used herein is a module that provides a command for a power circuit that causes the power circuit to provide a voltage controlled output.

Figure 4:
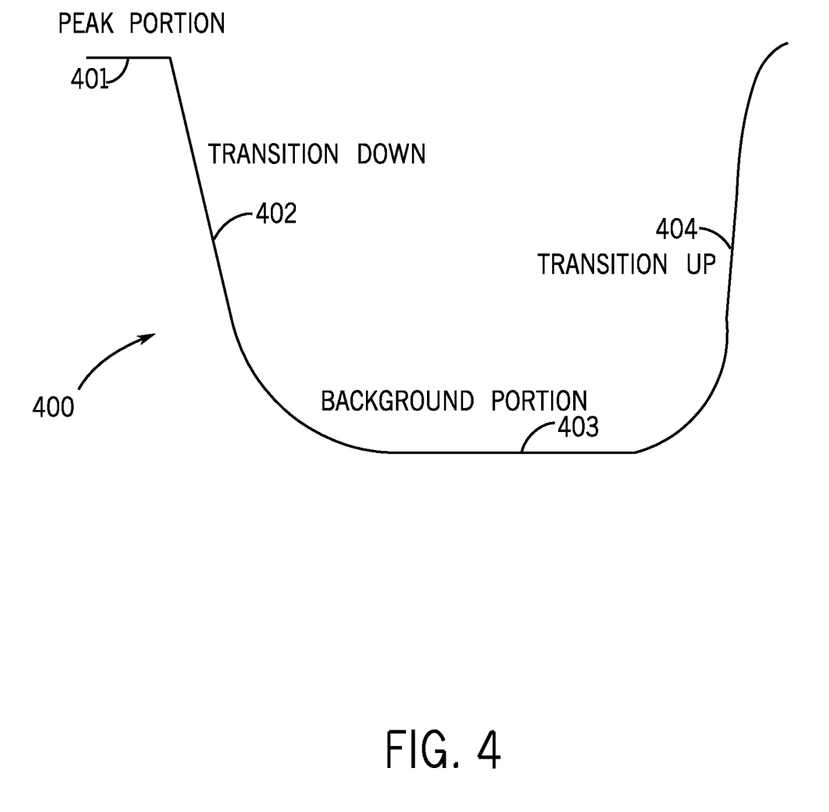
FIG. 4 is a pulse welding cycle in accordance with the present disclosure.

The controller causes the weld cycle to be that of FIG. 4, in the preferred embodiment, with a weld cycle 400 comprised of a peak portion 401, a transition down portion 402, a background portion 403 and a transition up portion 404. The peak portion 401 and background portion 403 are the controlled voltage portion of the pulse cycle. The transition down portion 402 and the transition up portion 404 are the controlled current portions of the pulse cycle in the prior art, but are a targeted voltage in the preferred embodiment.

Figure 7:
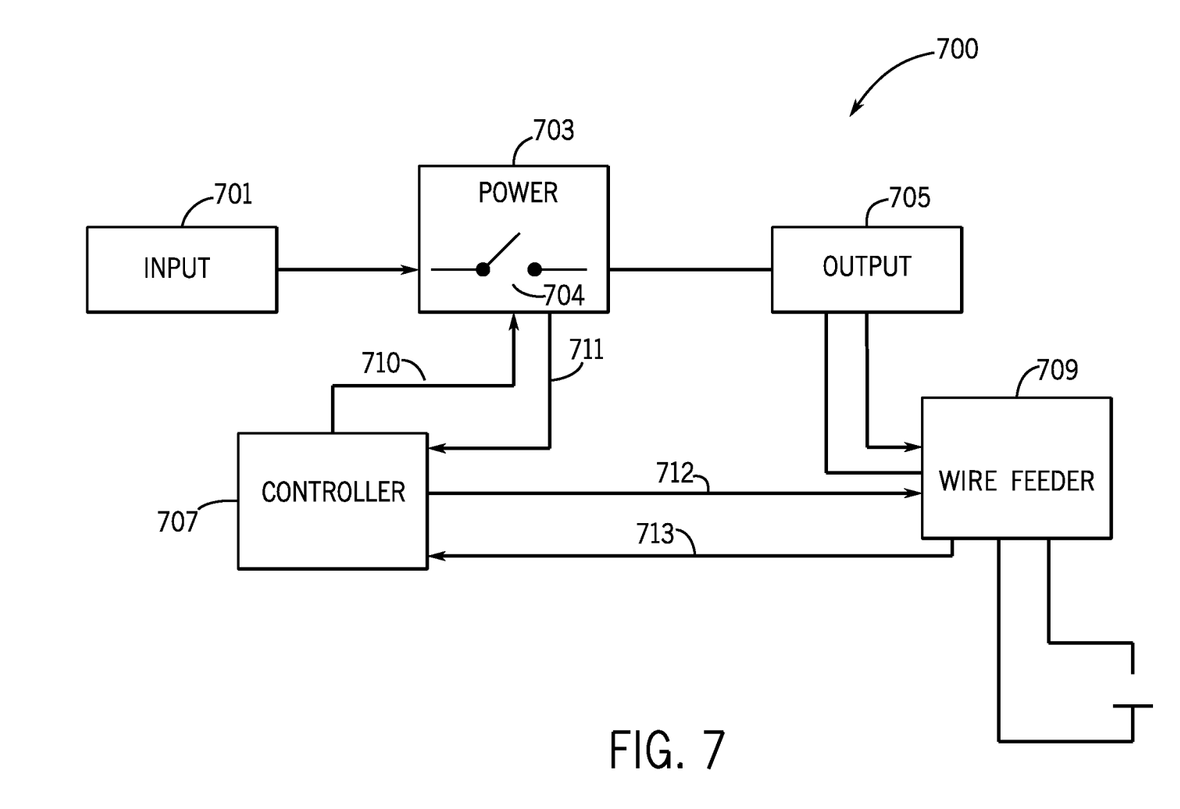
FIG. 7 is a welding system in accordance with the present disclosure.

Referring now to FIG. 7, a system for providing welding system 700 in accordance with the present disclosure includes a power source comprised of an input circuit 701, a power circuit 703 and an output circuit 705, a wire feeder 709, that are controlled by a controller 707 to produce a welding output. The various components may be disposed in separate or common housings, and may be in more than one housing (a portion of controller 707 can share a housing with the source, while another portion share a housing with wire feeder 709). Power circuit, as used herein, includes circuitry capable of supplying welding type power including converters, resonant power supplies, quasi-resonant power supplies, etc., and ancillary circuitry associated therewith.

One preferred embodiments provide that the power source is a Miller networked power source such as that described in U.S. Pat. No. 6,329,636 or U.S. Pat. No. 6,909,067, both of which are hereby incorporated by reference, and wire feeder 709 is a Miller networked wire feeder. Other wire feeders and power supplies may be used to implement the invention. Controller 707 is part of the commercially available components in the preferred embodiments.

Alternative embodiments provide that system 700 be another power supply, such as a CMT, RMD®, Accupulse®, IQ pulse®, or AC MIG power supply and provide the corresponding output, or other welding output. CMT output, as used herein, is an output that may be used for CMT welding. AC MIG output, as used herein, is an output that may be used for AC MIG welding. CMT power source, as used herein, includes a power source that provides a CMT output. AC MIG power source, as used herein, is a power source that provides an AC MIG output.

Input circuit 701 receives input power that can be 115 VAC single phase or 230/460 VAC three phase, or other utility or engine/generator power inputs. Preferably the input power is rectified and conditioned to be the intermediate power. Input circuit, as used herein, refers to circuits configured to receive an input signal and to provide an intermediate power signal, and may include things such as a rectifier, a transformer, a saturable reactor, a converter, an inverter, a filter, and/or a magnetic amplifier.

Power circuit 703 is preferably a high frequency DC to DC converter, such as a buck, boost, half bridge etc. A switch 704 is used to represent the switches in the converter, and may be comprised of one or more switches such as FETs. Other topologies may be used. Power circuit 703 preferably includes a power transformer to isolate the intermediate input from the welding output. Power circuit, as used herein, includes circuitry capable of supplying welding type power including converters, resonant power supplies, quasi-resonant power supplies, etc.

Power circuit 703 has a power control input 710 which provides the current command signal as an input to the converter. Then converter uses switch 704 to create the high power welding output. The output power is responsive to the power control input 710. Control input, as used herein, is an input to a circuit, such as a power circuit, that controls the output of the circuit Power circuit 703 receives high voltage low current intermediate power and provides low voltage high current pulse welding output power to the output circuit 705. Output circuit, as used herein, refers to circuits configured to receive power and to provide output power, and may include filters, converters, transformers, etc.

Power is delivered to wire feeder 709 by output circuit 705. Alternatively, output circuit 705 may be part of wire feeder 709. Wire feeder 709 feeds a spool of wire to the welding arc at a constant or controlled rate. The wire is burned off with the output current as controlled by the controller 707 The wire feed speed is set by the controller and sent to the wire feeder on line 712. A feedback circuit 713 (or 711) provides a feedback signal responsive to the output voltage and responsive to the output current to controller 707. As will be described in detail below, controller 707 uses the voltage and current feedback to control the welding pulse cycle. Feedback circuit, as used herein, is a circuit that cooperate to provide a feedback signal to a controller. Feedback signal, as used herein, includes one or more signals that provide information about one or more parameters being monitored, such as output current and output voltage.

Figure 9:
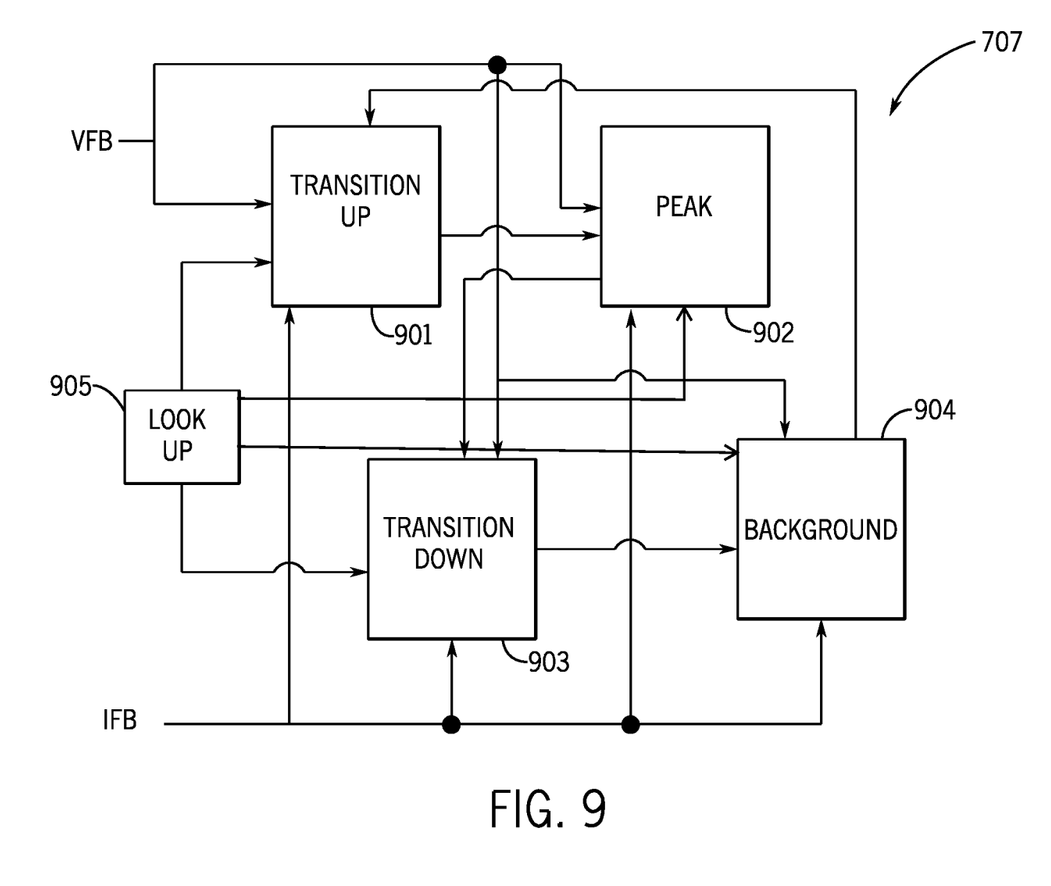
FIG. 9 is a controller in accordance with the present disclosure.

Referring now to FIG. 9, controller 707 has a peak module 902, a transition down module 903, a background module 904, and a transition up module 901. Each module controls a particular portion of the pulse waveform. The sequence will be explained starting with the peak module, but since this is a cyclical process, any portion could be considered as the start. Peak module 902 takes control and regulates a controlled voltage output during the peak portion of the waveform. The constant or controlled voltage maintains a constant or controlled arc length. Each module is preferably implemented with software, although hardware could be used. One embodiment uses the same code for modules 901-904, with different target parameters for each module.

At the end of the peak portion, the transition down portion begins. This is a controlled current transition which is responsive to the output voltage. The controller then begins the background portion of the pulse waveform. The background module 904 regulates the welding output in controlled voltage mode. The sequence ends with the transition up portion. The transition up, is a controlled transition responsive to output voltage. The cycle then repeats. Alternatives provide that all four portions are controlled voltage portions.

Controller 707 sequentially activates each module. The peak module starts the cycle by pulling desired voltages from the index table (Table 2 as described below). Each point in the index table is the desired voltage for a 50 usec time period At the end of the peak the controller activates the transition down module, then the background module, then the transition up module, and then back to the peak module, thereby commanding a welding cycle.

One or both of the peak module and the background module are controlled voltage modules. These modules have the primary duty to maintain a generally constant output voltage and hence a generally constant arc length. One or both of the transition up module and transition down module is a controlled current module, modified in accordance to the present disclosure to be responsive to the feedback output voltage, as described below.

Various alternatives provide that one or both of the transition up module and transition down module is responsive to a difference between a desired transition voltage and a previous transition voltage during at least one prior welding output cycle, and/or responsive to a difference between a measured output voltage and a background voltage from at least one prior cycle divided by the difference between the background voltage from the at least one prior cycle and a peak voltage from the at least one prior cycle. The at least one prior cycle is a plurality of prior cycles, and more specifically 16 cycle, in various embodiments. The prior cycles are the immediately prior cycles in the preferred embodiment, but could be earlier cycles.

Another alternative provides that the transition modules are responsive to a conductance multiplied by a desired output voltage. The conductance multiplied by the commanded current should give the desired voltage. When the actual voltage does not equal the desired voltage, error corrections can be made as described below. Look up table for the desired voltages can be used, and they can be based on formula, a plurality of prior cycles, or a plurality of predetermined values. Again, error between the actual and desired voltage can be used to correct or change the command so that the desired voltage is more likely obtained. The correction can be dependent on whether or not the output is in an arc state or a short state.

One embodiment of the control scheme provides that the steady state portion of the peak and background are measured. One or more samples are used for this measurement. Measurements are done on the prior pulse to affect changes for the next pulse. Feedback for both the current and the voltage are measured. Alternatives provide for using more than one prior pulse, or other than the immediately prior pulse.

For example, if the output voltage is getting too low, the output current needs to be increased to burn off more wire to get back the desired voltage. The peak and background voltages will be lower than expected. In the next weld cycle, the controller will need a current command output which is higher than the last weld cycle current. Controller 707 will calculate the current waveform needed for the next transition to be a percentage of the voltage between peak and background in accordance to the equation:

$$\text{I-transition} = ((\text{V-transition} - \text{V-background})/(\text{V-peak} - \text{V-background})) * (\text{I-peak} - \text{I-background}) + \text{I-background}$$

This gives a good estimate of where the current (I-transition) needs to be to achieve the desired voltage. This looking to where the process should be, and adding an offset to the command to try to meet that target. Controller 707 calculates the new I-transition based on the desired V-transition and adjusting for any changes in output voltage: I-transition=I-transition+(V-error*ProportionalGainConstant), where V-error=Previous V-transition−Measured V-Out from the previous 50 usec sample.

The ideal model for the curves and ramps may be calculated or based off a look-up table 905 (a predefined array of waveform values). These tables generally contain the voltage and currents desired at all times in the S-shaped waveform including the desired peak and desired background, if the prior art waveform of FIG. 3 is used.

Alternatively the error could also be compensated for the new Vtransition, to anticipate the error of the new command. This can be done with a derivative control or by adjusting the Measured Vactual by New Vtransition/Previous Vtransition and computing error on the Present Vtransition.

Another embodiment uses a look-up table with conductance. The conductance is the programmed currents divided by the voltage for each point in the pulse waveform. In this embodiment, the current transition is a function of the transition voltage times the conductance from the look-up table. The transition current equation is I-transition=(ComputedConductance*(V-transition).

The look-up table can then be compensated based on feedback. From the voltage and current from the last transition new conductance values can be calculated and used to update the table to account for the difference between measured values and expected or desired values.

Yet another embodiment uses actual voltages and currents, averaged from previous waveform cycles. An array of desired voltages is used from the pre-programed look-up table. From these measurements, a feed-forward model is made based on the actual currents for each point in the desired waveform. The feed-forward value is based on previous waveform at the same waveform location:

Itransition=ActualCurrents [TransitionIndex]

With the feed-forward model feedback values can be found based on previous waveforms Actual Voltage error and the feed-forward model transition currents:

Itransition=Itransition+(Desired Voltage [TransitionIndex]−ActualVoltage [TransitionIndex])*ProportionalGainConstant In this method, new current transitions values (I-transition) are used at each point in the pulse waveform.

In another embodiment, an array of values is calculated again but with conductances that are calculated from actual voltages and currents averaged from previous welding cycles. The feed-forward model is the prior measured actual conductance multiplied by the desired voltage:

Itransition=ActualConductance [TransitionIndex] *DesiredVoltage[TransitionIndex]

As before the feedback is: transition=Itransition+ (Desired Voltage [TransitionIndex]−ActualVoltage [TransitionIndex])*ProportionalGainConstant The current values of the Transition up and Transition down values from the look-up table are modified based on the output feedback and a feed-forward model in the above alternatives.

In a preferred embodiment, the initial waveforms are generated from taught values, such as that in Table 1. Taught values, as used herein, refers to values corresponding to desired output parameters of various portions or times of a weld cycle that have been previously taught to or stored in the controller. From the taught peak voltage, peak current, background voltage, background current, pulse-width and frequency, the three waveforms of Taught Current, Desired Voltage and Taught Conductance are calculated, and shown in Table 2.

TABLE 1

| Taught Parameter | Voltage | Current | Time |
|---|---|---|---|
| Peak | 30 | 380 | 4 |
| Background | 16.5 | 100 | 12 |

TABLE 2

| Waveform Current | Waveform Voltage | Conductance |
|---|---|---|
| 100.00 | 16.50 | 6.06 |
| 100.43 | 16.52 | 6.08 |
| 101.72 | 16.58 | 6.13 |
| 103.87 | 16.69 | 6.22 |
| 106.85 | 16.83 | 6.35 |
| 110.66 | 17.01 | 6.50 |
| 115.26 | 17.24 | 6.69 |
| 120.63 | 17.49 | 6.90 |
| 126.74 | 17.79 | 7.12 |
| 133.54 | 18.12 | 7.37 |
| 141.01 | 18.48 | 7.63 |
| 149.08 | 18.87 | 7.90 |
| 157.71 | 19.28 | 8.18 |
| 166.85 | 19.72 | 8.46 |
| 176.44 | 20.19 | 8.74 |
| 186.42 | 20.67 | 9.02 |
| 196.74 | 21.16 | 9.30 |
| 207.32 | 21.67 | 9.57 |
| 218.10 | 22.19 | 9.83 |
| 229.02 | 22.72 | 10.08 |
| 240.00 | 23.25 | 10.32 |
| 250.98 | 23.78 | 10.55 |
| 261.90 | 24.31 | 10.78 |
| 272.68 | 24.83 | 10.98 |
| 283.26 | 25.34 | 11.18 |
| 293.58 | 25.83 | 11.36 |
| 303.56 | 26.31 | 11.54 |
| 313.15 | 26.78 | 11.69 |
| 322.29 | 27.22 | 11.84 |
| 330.92 | 27.63 | 11.98 |
| 338.99 | 28.02 | 12.10 |
| 346.46 | 28.38 | 12.21 |
| 353.26 | 28.71 | 12.30 |
| 359.37 | 29.01 | 12.39 |
| 364.74 | 29.26 | 12.46 |
| 369.34 | 29.49 | 12.53 |
| 373.15 | 29.67 | 12.58 |
| 376.13 | 29.81 | 12.62 |
| 378.28 | 29.92 | 12.64 |
| 379.57 | 29.98 | 12.66 |
| 380.00 | 30.00 | 12.67 |
| 379.57 | 29.98 | 12.66 |
| 378.28 | 29.92 | 12.64 |
| 376.13 | 29.81 | 12.62 |
| 373.15 | 29.67 | 12.58 |
| 369.34 | 29.49 | 12.53 |
| 364.74 | 29.26 | 12.46 |
| 359.37 | 29.01 | 12.39 |
| 353.26 | 28.71 | 12.30 |
| 346.46 | 28.38 | 12.21 |
| 338.99 | 28.02 | 12.10 |
| 330.92 | 27.63 | 11.98 |
| 322.29 | 27.22 | 11.84 |
| 313.15 | 26.78 | 11.69 |

TABLE 2-continued

| Waveform Current | Waveform Voltage | Conductance |
|---|---|---|
| 303.56 | 26.31 | 11.54 |
| 293.58 | 25.83 | 11.36 |
| 283.26 | 25.34 | 11.18 |
| 272.68 | 24.83 | 10.98 |
| 261.90 | 24.31 | 10.78 |
| 250.98 | 23.78 | 10.55 |
| 240.00 | 23.25 | 10.32 |
| 229.02 | 22.72 | 10.08 |
| 218.10 | 22.19 | 9.83 |
| 207.32 | 21.67 | 9.57 |
| 196.74 | 21.16 | 9.30 |
| 186.42 | 20.67 | 9.02 |
| 176.44 | 20.19 | 8.74 |
| 166.85 | 19.72 | 8.46 |
| 157.71 | 19.28 | 8.18 |
| 149.08 | 18.87 | 7.90 |
| 141.01 | 18.48 | 7.63 |
| 133.54 | 18.12 | 7.37 |
| 126.74 | 17.79 | 7.12 |
| 120.63 | 17.49 | 6.90 |
| 115.26 | 17.24 | 6.69 |
| 110.66 | 17.01 | 6.50 |
| 106.85 | 16.83 | 6.35 |
| 103.87 | 16.69 | 6.22 |
| 101.72 | 16.58 | 6.13 |
| 100.43 | 16.52 | 6.08 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |

TABLE 2-continued

| Waveform Current | Waveform Voltage | Conductance |
|---|---|---|
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |
| 100.00 | 16.50 | 6.06 |

The preferred embodiment has extended the voltage compensation to be used over the entire waveform, not just during the transitions. It is based on the conductance index containing all the information needed to generate the desired waveform. The index has values for every 50 usec of the pulse waveform—including all portions (see Table 2 above). The waveform compensation feedback is run in the control loop every 50 usec A 50 usec control loop runs algorithms that set various parameters. A Voltage Feedback Compensation algorithm sets Verror=Previous Desired Voltage−Measured Voltage and VerrorSum=VerrorSum+Verror. A Short Compensation algorithm increases VoltageCompShort a small amount if there is a low minimal short response, and increases VoltageCompShort a larger amount if there is a hard short response, and if no short response then VoltageCompShort will decrement towards zero.

An Arc Adjust Compensation algorithm (scaling is 0 to 100, nominal is 50) sets ArcAdjustVoltage=((ArcAdjust−50)*WaveformVoltage[index])/100. A Calc Desired Voltage Command algorithm sets NewDesiredVoltage=WaveformVoltage[index]+VerrorSum/Scaling+VoltageCompShort[Index]+ArcAdjustVoltage. A Calc New Engine Current Command algorithm sets Icommand=NewDesiredVoltage*Conductance [index]. Also, a Conductance Calc algorithm calculates Average Peak Voltage, Background Voltage, Peak Current, Background Current.

The measured peak voltage and current and background voltage and current are used to recompute the conductance table. One embodiment provides for averaging 16 peaks and 16 backgrounds to get the average. A new peak conductance is calculated using these values, and a new background conductance is calculated based on these. These values are then used to scale a new conductance waveform.

The entire waveform of conductance, voltage and/or current is calculated in the background (not an interrupt), in one embodiment. However it could be calculated in the 50 us interrupt as well, or only the conductance needed for that 50 us interval could be calculated. The VoltageCompShort could have individual 50 us values, or a single value used to compensate the entire waveform. Resistance could be used instead of conductance. Verror could be used instead of the VerrorSum, but would require some scaling.

Figure 5:
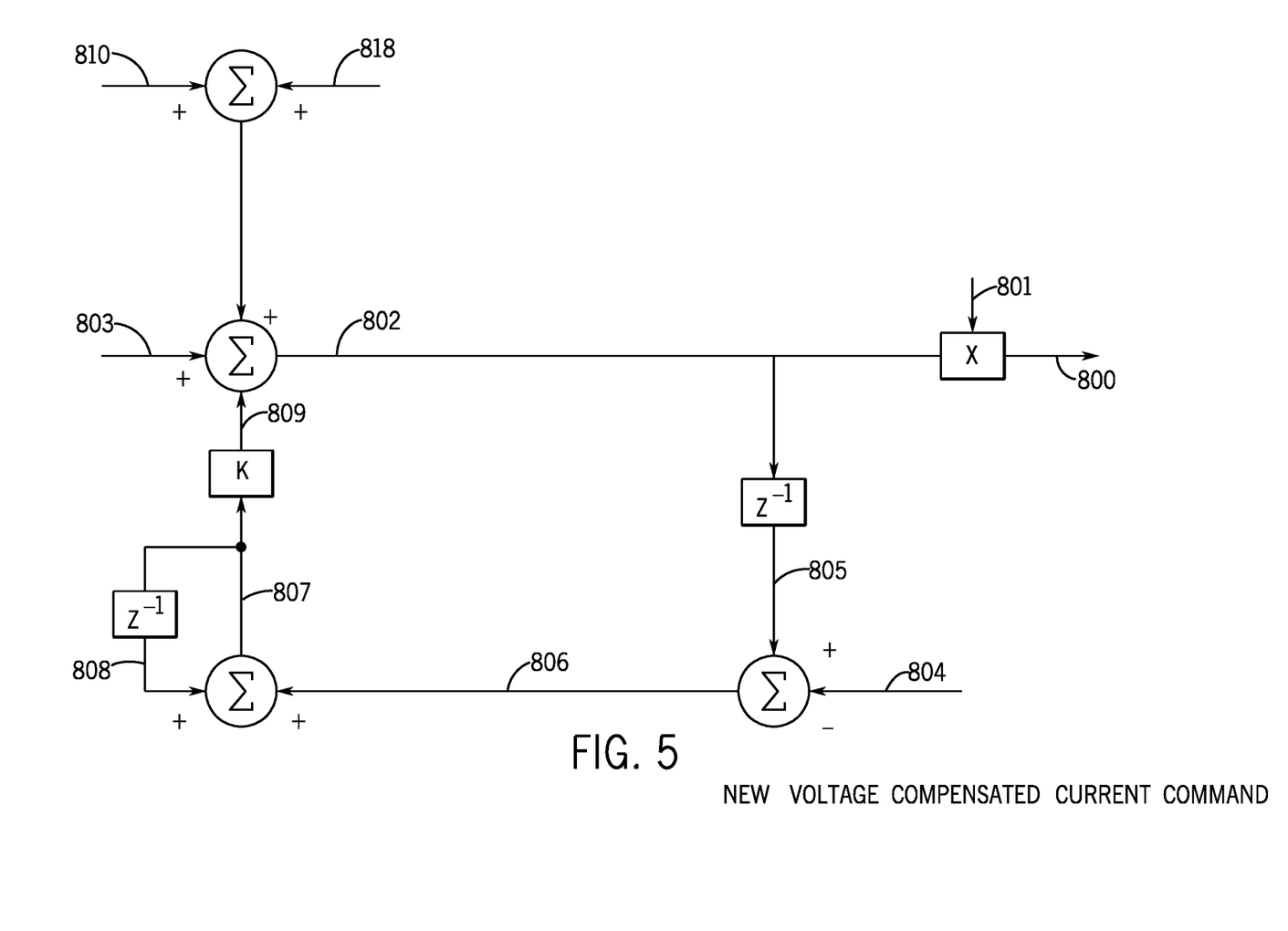
FIG. 5 is a control for pulse welding cycle in accordance with the present disclosure.
Figure 6:
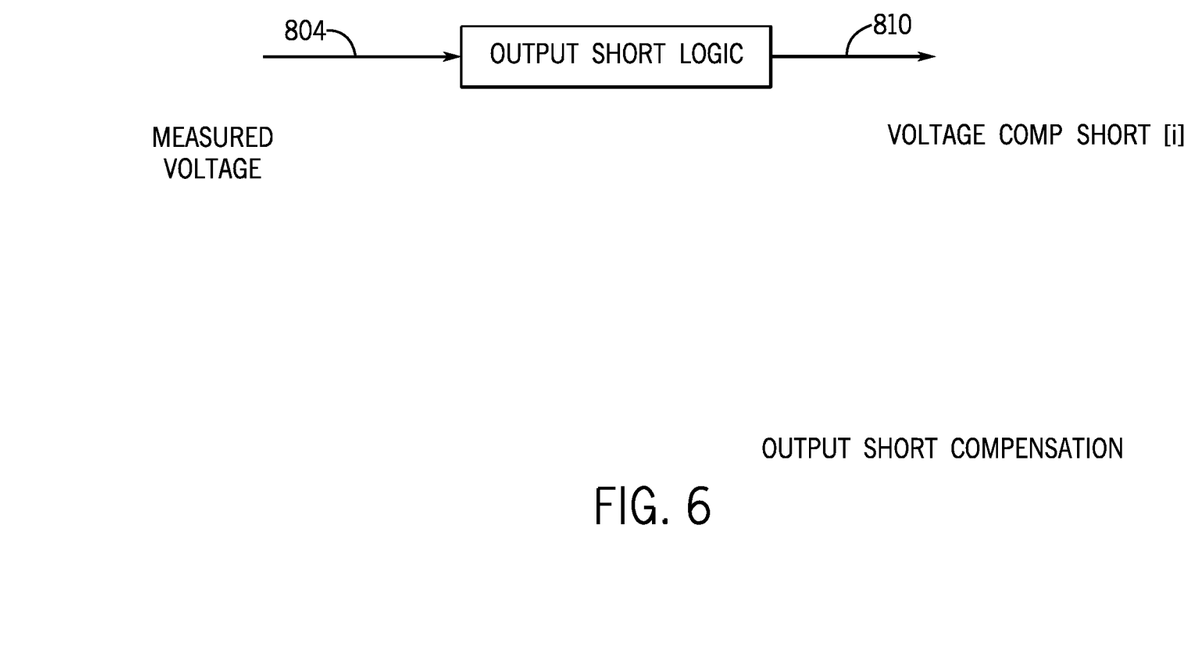
FIG. 6 is a control for pulse welding cycle in accordance with the present disclosure.
Figure 8:
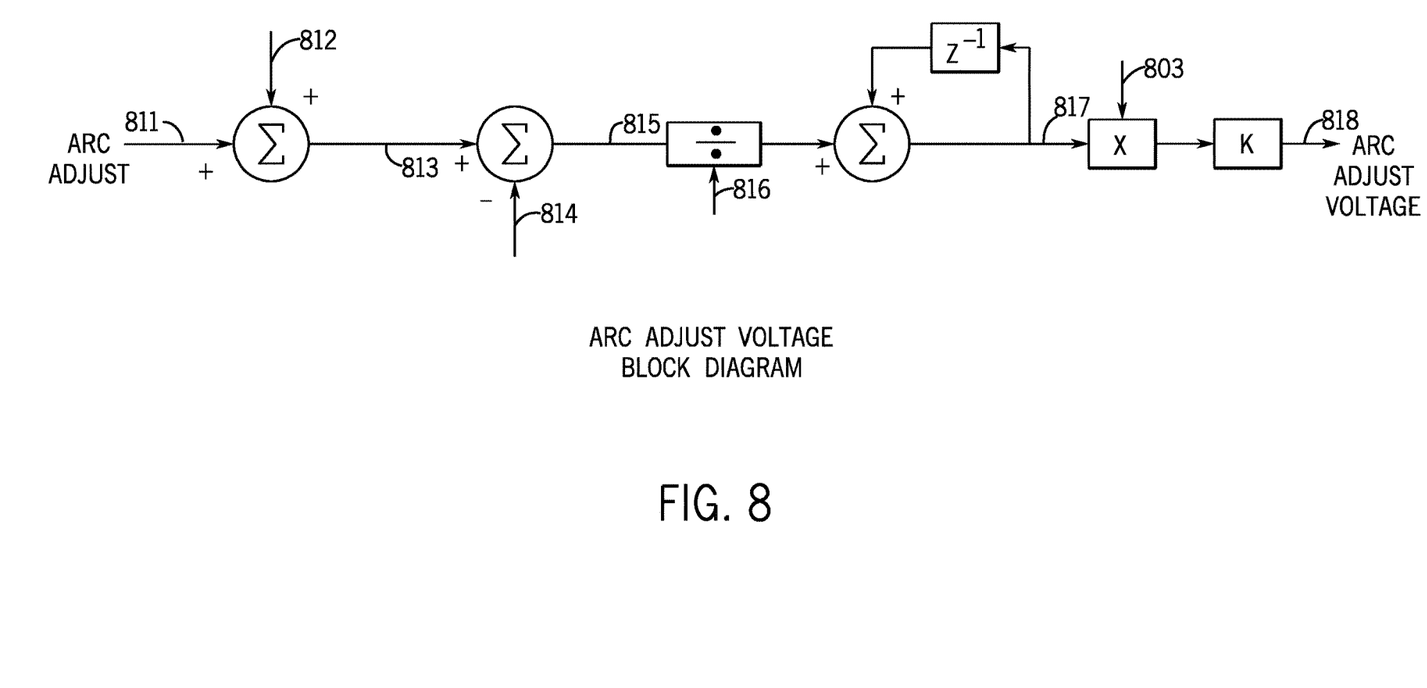
FIG. 8 is a control scheme for pulse welding cycle in accordance with the present disclosure.

The control algorithms in FIGS. 5, 6 and 8 are used to implement the preferred embodiment. Referring to FIGS. 5, 6 and 8, I current command 800 is the NewDesiredVoltage 802 divided by the Conductance [I] 801. Where: NewDesiredVoltage 802 is the sum of four variables: WaveformVoltage[i] 803, VerrorSum/scaling 809, VoltagecompShort[i] 810 and ArcAdjustVoltage 818. WaveformVoltage[i] 803 is taken from the index table, VerrorSum 807/scaling is 809 is VerrorSum plus Verror 806. Verror 806 is last DesiredVoltage 805 minus MeasuredVoltage 804.

VoltagecompShort[i] 810 is a small additional compensation used only during the time when a short is detected from MeasuredVoltage 804. VoltagecompShort[i] 810 is increased a small amount if there is a minimal short and increased a larger amount if there is a hard short. If there is no short, VoltagecompShort[i] 810 is decreased a little till it is zero.

ArcAdjustVoltage 818 is a voltage trim that the welding operator can vary to suit their style of welding. It is common in the industry to have a voltage trim on pulse welding power supplies where the waveform is otherwise dictated by the preprogramed tables. ArcAdjustVoltage 818 is calculated from gPercentArcAdjust 817 multiplied by DesiredVoltageWaveform[i] 803 take from the table. gPercentArcAdjust 817 is the sum of the last gPercentArcAdjust 817, and ArcAdjustVoltageError 815 divided by AvgWaveformAdaptiveVoltage 816. ArcAdjustVoltageError 815 the DesiredArcAdjustVoltage 813 minus the ActualWaveformVoltage 814. DesiredArcAdjustVoltage 813 is the sum of the AvgWaveformAdaptiveVoltage 812 plus the user input ArcAdjust 811 less 50.

The conductance table can be changed based on the average values of peak and background voltage and current, such as a 16 pulse average.

According to one alternative controller 707 controls system 700 to provide a controlled voltage during at least one of the peak portion and the background portion, and preferably during both, and, during one or both of the transition portions the switching of switch 704 is controlled by a voltage ramping algorithm that tracks to a target voltage waveform shape. The voltage waveform shape can be stored in look up table 905, or in other memory. The commands that controller 707 provides to obtain the desired voltage waveform may be adjusted based on prior history to reduce the difference between the desired value and actual value, as described in various ways above. This allows a controlled current power supply to provide a controlled voltage process.

Another alternative provides the feed forward control loop on previous currents as Old Average Current Command=An averaged sum of the previous X currents used to generate the voltage at this waveform point. New Current Command=Old Average Current Command+Verr*Gain. Where Verr=(V desired−V measured), and X is some desired filtering rate (of previous currents), and X>=1.

Another alternative provides that the transitions are controlled to follow a voltage waveform and/or a controlled voltage portion and/or controlled current using a voltage feedback, and the peak and background portions can be either cc, cv, controlled current or voltage, a combination thereof, or use other control loops such as heat input, average voltage or current, power, etc.

The control loops described above can be used with any of the waveforms described herein, and/or can be use on one portion of the welding cycle, a plurality of portions of the welding cycle, or all of the welding cycle.

Numerous modifications may be made to the present disclosure which still fall within the intended scope hereof Thus, it should be apparent that there has been provided a method and apparatus for providing pulse welding power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A welding-type system for providing a plurality of welding cycles, each cycle including a peak portion, a transition down portion, a background portion, and a transition up portion, comprising:
an input circuit disposed to receive input power and to provide intermediate power;
a power circuit, having a power control input and at least one switch responsive to the power control input, and wherein the power circuit is disposed to receive intermediate power and provide welding-type output power to an output circuit, wherein the output power has an output voltage and an output current;
a feedback circuit, having a feedback signal responsive to at least one of the output voltage and responsive to the output current; and
a controller, that receives the feedback signal, and having a peak module, a transition down module, a background module, and a transition up module, wherein the controller sequentially activates the peak module, then the transition down module, then the background module, then the transition up module, and then back to the peak module, thereby commanding a welding cycle;
wherein at least one of the peak module and the background module is a controlled voltage module, and at least one of the transition up module and transition down modules is a controlled current module; and
wherein the at least one of the transition up module and transition down module have a transition current command output that is responsive to output voltage.

2. The system of claim 1, wherein both of the transition up module and transition down module are controlled current modules, and further wherein both of the transition up module and transition down module have a transition current command output that is responsive to output voltage.

3. The system of claim 1, wherein the transition current command output for the at least one of the transition up module and transition down module is responsive to a difference between a desired transition voltage and a previous transition voltage during at least one prior welding output cycle.

4. The system of claim 3, wherein the transition current command output for the at least one of the transition up module and transition down module is further responsive to a difference between a measured output voltage and a background voltage from at least one prior cycle divided by the difference between the background voltage from the at least one prior cycle and a peak voltage from the at least one prior cycle.

5. The system of claim 3, wherein the at least one prior cycle is a plurality of prior cycles.

6. The system of claim 1, wherein the transition current command output for the at least one of the transition up module and transition down module is provided for a transition and is responsive to a conductance multiplied by a desired output voltage.

7. The system of claim 6, wherein the conductance varies over the transition based on at least one of a formula, a plurality of prior cycles, or a plurality of predetermined values.

8. The system of claim 7, wherein the desired output voltage is responsive to a plurality of taught values and a difference between a prior desired output voltage and a prior actual voltage for at least one prior cycle.

9. The system of claim 8, wherein the desired output voltage is further responsive to whether or not the output is in an arc state or a short state.

10. A system for providing welding type power, wherein the welding type power is provided as a plurality of welding cycles, each cycle including a peak portion, a transition down portion, a background portion, and a transition up portion, comprising:

means for receiving input power and providing intermediate power;

means for receiving the intermediate power and switching the intermediate power to provide welding-type output power, wherein the output power has an output voltage and an output current, wherein the means for receiving the intermediate power is connected to the means for receiving input power;

means for providing a feedback signal responsive to the output voltage and responsive to the output current, connected to the means for receiving the intermediate power; and means for controlling the switching in response to the feedback signal to provide the peak portion, the transition down portion, the background portion, and transition up portion, thereby providing a welding cycle, connected to the means for receiving the intermediate power and the means for providing a feedback signal; and wherein the means for controlling further includes means for providing a controlled voltage during at least one of the peak portion and the background portion; and wherein the means for controlling further includes transitions control means for providing a controlled current during at least one of the transition up portion and the transition down portion, and wherein the transition means is responsive to output voltage.

11. The system of claim 10, wherein the transition means is responsive to a difference between a desired transition voltage and a previous transition voltage on at least one prior welding output cycle, and wherein the transition means is further responsive to a difference between a measured output voltage and a background voltage from at least one prior cycle divided by the difference between the background voltage from the at least one prior cycle and a peak voltage from the at least one prior cycle.

12. The system of claim 11, wherein the transition means is responsive to at least one of a conductance multiplied by a desired output voltage and a resistance multiplied by a desired output voltage.

13. The system of claim 12, wherein the transition means varies the conductance based on at least one of a formula, a plurality of prior cycles, or a plurality of predetermined values.

14. The system of claim 13, wherein the transition means varies the desired output voltage in response to a plurality of taught values and a difference between a prior desired output voltage and a prior actual voltage for at least one prior cycle, and wherein the desired output voltage is further responsive to whether or not the output is in an arc state or a short state.

* * * * *